US007720680B2

(12) United States Patent
Weng et al.

(10) Patent No.: US 7,720,680 B2
(45) Date of Patent: May 18, 2010

(54) INTERACTIVE MANUAL, SYSTEM AND METHOD FOR VEHICLES AND OTHER COMPLEX EQUIPMENT

(75) Inventors: Fuliang Weng, Mountain View, CA (US); Hauke Schmidt, San Bruno, CA (US); Gengyan Bei, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 10/871,249

(22) Filed: Jun. 17, 2004

(65) Prior Publication Data

US 2005/0283363 A1 Dec. 22, 2005

(51) Int. Cl.
*G10L 15/26* (2006.01)
(52) U.S. Cl. ........................ 704/235; 704/275
(58) Field of Classification Search ........... 704/235, 704/275
See application file for complete search history.

(56) References Cited

U.S. PATENT DOCUMENTS

| | | | |
|---|---|---|---|
| 5,748,841 A | 5/1998 | Morin et al. | |
| 6,330,499 B1 | 12/2001 | Chou et al. | |
| 6,418,431 B1 | 7/2002 | Mahajan et al. | |
| 6,457,024 B1* | 9/2002 | Felsentein et al. | 707/206 |
| 6,526,335 B1 | 2/2003 | Treyz et al. | |
| 6,937,975 B1* | 8/2005 | Elworthy | 704/9 |
| 2002/0004719 A1 | 1/2002 | Hogenhout | |
| 2004/0083092 A1* | 4/2004 | Valles | 704/9 |
| 2005/0038660 A1* | 2/2005 | Black et al. | 704/275 |
| 2005/0108249 A1* | 5/2005 | Schalk et al. | 707/10 |
| 2005/0131695 A1* | 6/2005 | Lucente et al. | 704/257 |
| 2005/0131892 A1* | 6/2005 | Knott et al. | 707/5 |
| 2005/0187675 A1* | 8/2005 | Schofield et al. | 701/2 |
| 2005/0203748 A1* | 9/2005 | Levas et al. | 704/275 |
| 2005/0216458 A1* | 9/2005 | Morris et al. | 707/5 |
| 2009/0198354 A1* | 8/2009 | Wilson | 700/90 |

FOREIGN PATENT DOCUMENTS

| | | |
|---|---|---|
| EP | 1 385 099 | 1/2004 |
| JP | 2005014751 | 1/2002 |
| JP | 2002510076 | 4/2002 |
| WO | WO 99/50830 | 10/1999 |

OTHER PUBLICATIONS

European Search Report, Application No. EP 05 72 5969, dated Mar. 27, 2009.
Marrenbach, J., et al., "Development and Multimodal Operation of a Multimedia Car Instruction Manual," IFAC/IFIP/IFORS/IEA Symposium on Analysis, Design and Evaluation of Human-Machine Systems, pp. 47-50 (2001).

* cited by examiner

*Primary Examiner*—David R Hudspeth
*Assistant Examiner*—Jakieda R Jackson
(74) *Attorney, Agent, or Firm*—Kenyon & Kenyon LLP

(57) ABSTRACT

A method and system of providing an interactive manual, including a speech engine to receive and process speech from a user, convert the speech into a word sequence, and identify meaning structures from the word sequence, a structured manual including information related to an operation of a device, a visual model to relate visual representation of the information, a dialog management arrangement to interpret the meaning structures in a context and to extract pertinent information and the visual representation from the structured manual and the visual model, and an output arrangement to output the information and visual representation.

38 Claims, 5 Drawing Sheets

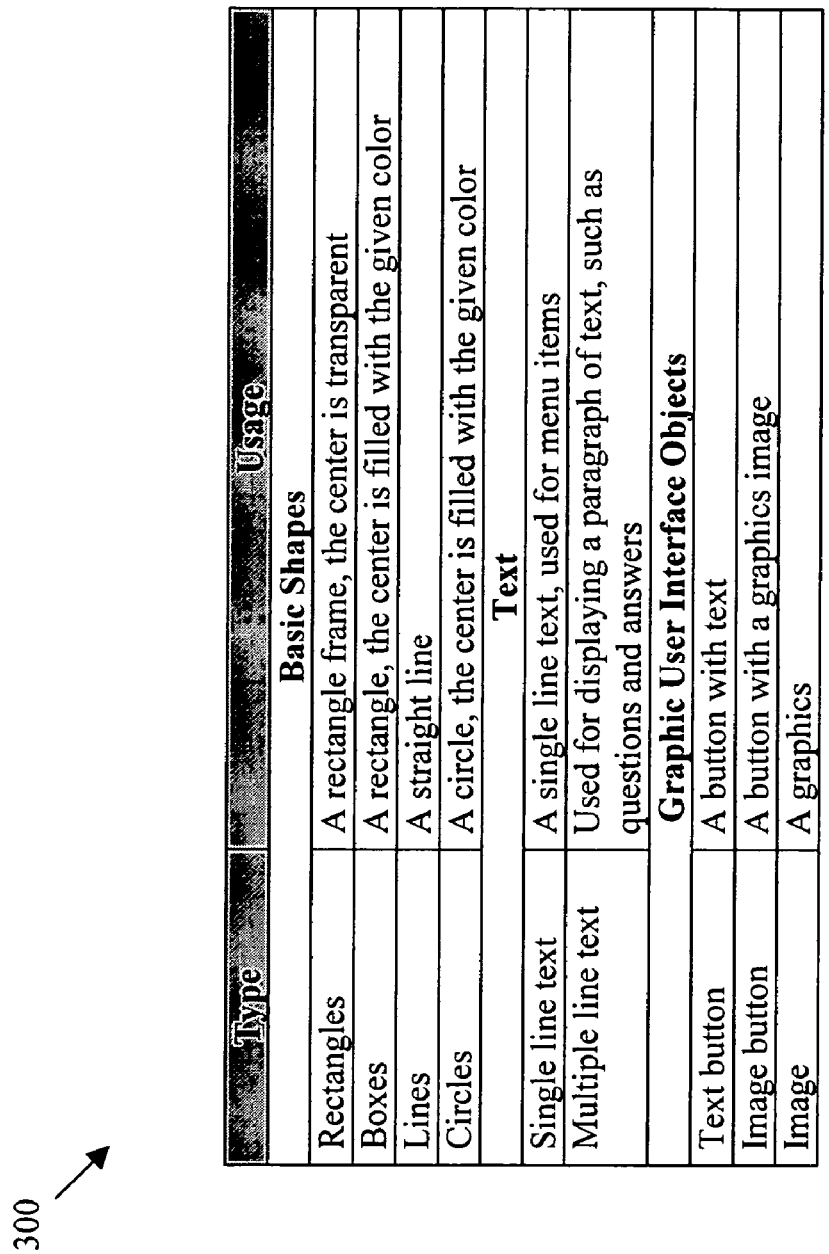

| Type | Usage |
|---|---|
| Basic Shapes | |
| Rectangles | A rectangle frame, the center is transparent |
| Boxes | A rectangle, the center is filled with the given color |
| Lines | A straight line |
| Circles | A circle, the center is filled with the given color |
| Text | |
| Single line text | A single line text, used for menu items |
| Multiple line text | Used for displaying a paragraph of text, such as questions and answers |
| Graphic User Interface Objects | |
| Text button | A button with text |
| Image button | A button with a graphics image |
| Image | A graphics |

Figure 3

INTERACTIVE MANUAL, SYSTEM AND METHOD FOR VEHICLES AND OTHER COMPLEX EQUIPMENT

CROSS REFERENCE TO RELATED APPLICATIONS

This application relates to U.S. patent application Ser. No. 10/427,601 entitled "Method for Statistical Language Modeling in Speech Recognition", which was filed Apr. 30, 2003, and U.S. application Ser. No. 10/613,366, entitled "A Fast Feature Selection Method and System for Maximum Entropy Modeling", which was filed Jul. 3, 2003, the disclosures of which are incorporated by reference herein in their entirety.

FIELD OF THE INVENTION

The present invention relates to an interactive manual for a device, including a vehicle device.

BACKGROUND INFORMATION

Manuals may be too generic and cumbersome for many people, and it is believed that there are people who do not like to read manuals. While some devices may be usable without a manual, other devices may be more complicated requiring a manual to operate them. This problem may become worse since automotive industry trends may indicate that more devices are being integrated into vehicles.

Those who use manuals for vehicles or other complex equipment or devices may complain that it is tedious to read these manuals. In particular, when traveling, for example, they may rent a car, which is unfamiliar, and may have little time to peruse the manual due to, for example, a tight travel schedule.

The reluctance and/or unwillingness to use manuals may be explained in that these manuals may only utilize written languages, which may be adequate in some circumstances, for example, to explain abstract concepts, but not in other instances, for example, to explain intuitive objects or process. Additionally, manuals may be designed for general users and not for each individual need at each specific occasion.

U.S. Pat. No. 6,330,499 refers to a vehicle diagnosis and health monitoring system that uses a client/server architecture to keep vehicle relevant data in a database and to check the status of the vehicle remotely using a voice interface. U.S. Pat. No. 6,330,499 indicates that the diagnosis and health monitoring system may be used to update user manuals but there is no direct link to any manual construction process.

U.S. Pat. No. 6,526,335 refers to an automobile personal computer system that allows a user to wirelessly interact with merchants, communications facilities, information providers, computers at the home or office, and other entities. Products may be purchased using voice commands or by interacting with displays in the automobile.

U.S. Patent Publication 20020004719 refers to a machine interface for interfacing a user to a machine that receives input words from the user. Scores for at least some of the input words are determined using scores for words appearing in each passages of the text. A passage in the text having the highest combined score for the input words is identified and a corresponding dialogue instruction set is executed to generate words for output and to respond to input words from the user. In this regard, the system of U.S. Patent Publication 20020004719 merely returns a text passage with the highest score without further representation. No preprocessing or structural investigation of the document occurs.

SUMMARY OF THE INVENTION

An exemplary embodiment and/or method of the present invention may be used to integrate spoken language and a visual display, including, for example, a 2-D or 3-D visual display, into an interactive manual to provide a more natural and intuitive communication tool for humans. This may significantly reduce the amount of time and may greatly facilitate the process in learning the operation of various devices. The exemplary embodiment and/or method of the present invention may be applied not only to manuals for in-car devices, but also to manuals for other devices as well, including sophisticated devices.

An exemplary embodiment and/or method of the present invention may use advanced language understanding techniques and visual modeling to construct an interactive manual for complex devices, including, for example, devices that reside in, or are integrated into, a vehicle.

An exemplary interactive manual according to the present invention may provide both verbal and visual information to guide the user in learning the operation of a particular device and/or vehicle. For example, the exemplary interactive manual may provide users with the ability to query information in natural language, such as, for example, plain English or any other suitable spoken language. The exemplary interactive manual may also provide users with the ability the display information into one or more perspective views with zoom-in and zoom-out capabilities depending upon the user query.

An exemplary embodiment and/or method of the present invention may be used to provide an interactive manual that may better facilitate the cognitive learning process of each individual, so that people may efficiently and effectively acquire the required operating information.

An exemplary interactive manual according to the present invention may return a verbal message together with visual information, such as, for example, a 2-D or 3-D graphic representation or a sequence of graphic representations. The verbal message and/or visual information may directly target at the question from the user. The 2-D or 3-D graphic representation may be vehicle-specific, instead of generic, so that the user may more easily locate the corresponding object and learn the operation of certain devices.

An exemplary interactive manual according to the present invention may be configured for each individual need on each individual occasion.

An exemplary interactive manual according to the present invention may be configured to understand that different phrases may have the same meaning or relate to the same concept. In this regard, the exemplary interactive manual may permit users to use different phrases to denote the same object or the same process, e.g., "the opening of gas tank", or "the lid for gas tank".

An exemplary interactive manual according to the present invention may permit users to see precisely where the object is and what it looks like, in one or more views and/or perspectives. In this regard, the exemplary interactive manual may use verbal and/or visual cues to guide the user to the appropriate location.

An exemplary interactive manual according to the present invention may permit users to understand how to operate a device in an interactive way, particularly if the device operation involves multiple steps. An exemplary interactive manual system may, therefore, show the user how to operate the device in a manner that the user feels that they are involved in the learning process.

An exemplary interactive manual according to the present invention may involve elements that may be preprocessed and structured based on human cognition for better conversation and learning.

An exemplary embodiment and/or exemplary method of the present invention may demonstrate device functions by answering user questions in a visual and verbal manner. In this regard, the functions of the device may be understood in a more intuitive interactive format.

An exemplary embodiment and/or exemplary method of the present invention may involve the construction of one or more device models, which are modular in nature to the overall system so that a common format of presentation may be provided to the user despite differing devices. In this regard, the overall system may be configurable with an appropriate device model with little or no modification of the software.

An exemplary embodiment and/or exemplary method may allow users to explore and navigate the model so that a simulation of the device environment may provide where users may "look around" and "play" with the controls.

An exemplary embodiment and/or exemplary method may use animation clips to demonstrate device functions and respond to queries, including, for example, "how-to" queries.

An exemplary embodiment and/or exemplary method may use a Text-To-Speech (TSS) application to provide answers to questions, including, for example, "what-is" questions.

According to an exemplary embodiment and/or exemplary method, at any given time a user may be watching an animation clip or a non-animation frame. An animation may include a sequence of frames. Each frame may be narrated by a Text-To-Speech (TTS) application, and each frame may be shown for only a fixed amount of time before the next frame is loaded. A non-animation frame may be displayed for an unlimited amount of time until the user requests a change.

BRIEF DESCRIPTION OF THE DRAWINGS

FIG. 3 shows exemplary types of animation objects.

DETAILED DESCRIPTION

Figure 1:
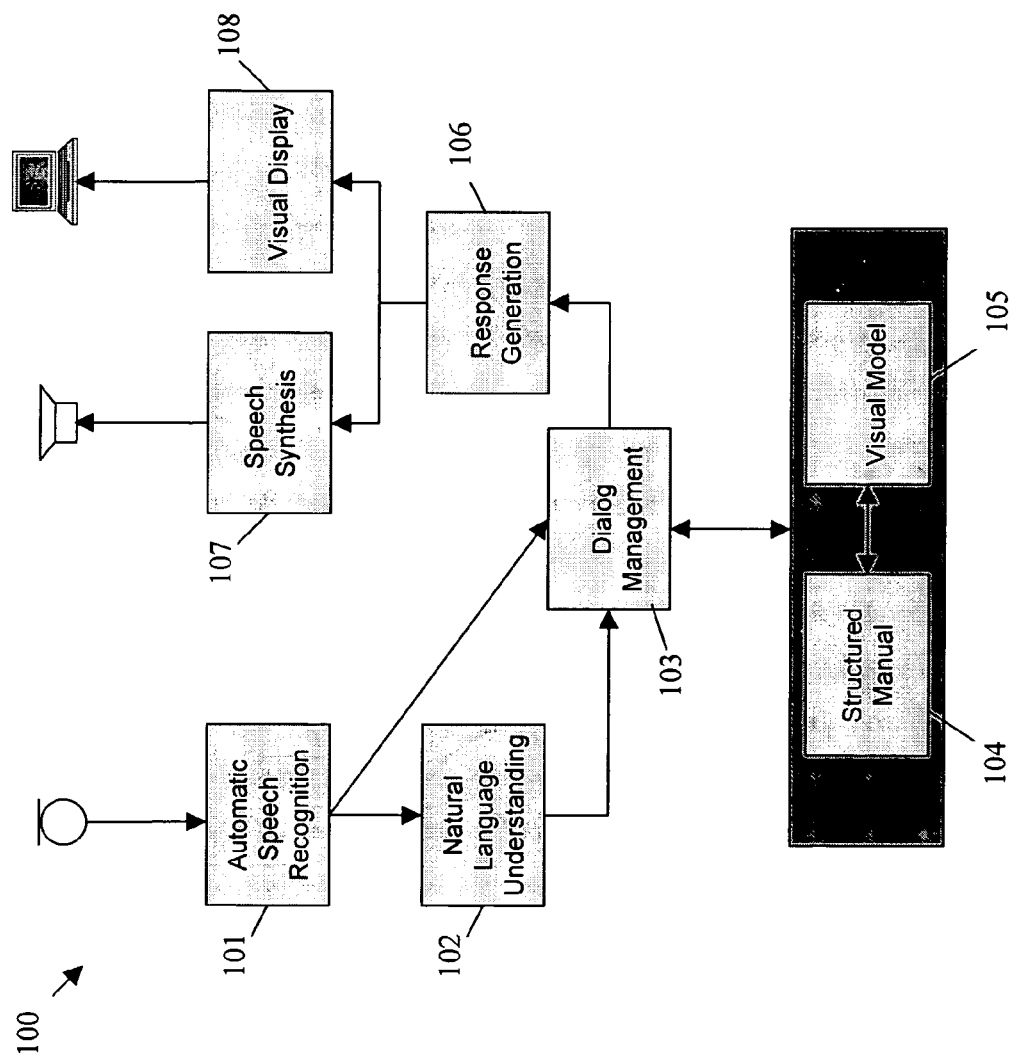
FIG. 1 shows an exemplary system to provide an interactive manual.

FIG. 1 shows an exemplary system 100 to provide an interactive manual. The exemplary system 100 includes an automatic speech recognition arrangement 101, a natural language understanding arrangement 102, a dialog management arrangement 103, a structured manual 104, a visual model 105, a response generation arrangement 106, a speech synthesis arrangement 107, and a visual display arrangement 108. The exemplary system 100 may be implemented, for example, as computer software that is executable on a suitable processing arrangement.

The automatic speech recognition arrangement 101 transforms speech signals into discrete representations, such as, for example, word sequences, which may be assigned proper meaning at a later stage. In particular, the automatic speech recognition arrangement 101 receives the user's speech, spectrally analyzes the speech for salient features, and converts the speech into digitally encoded feature vectors, which are examined to extract phone sequences (e.g., simple vowel or consonant sounds) using knowledge about acoustic environments, gender, dialect differences, and phonetics. The phone sequences are then converted into corresponding word sequences using, for example, knowledge of what constitutes a possible word, what words are likely to occur, and in what sequence (called language models (LM)). In this regard, an exemplary embodiment and/or method of the present invention may use techniques described, for example, in U.S. patent application Ser. No. 10/427,601 entitled "Method for Statistical Language Modeling in Speech Recognition", which was filed Apr. 30, 2003, the disclosure of which is incorporated by reference herein in its entirety.

The natural language understanding arrangement 102 receives the word sequences from the automatic speech recognition arrangement 101 and identifies the meaning structures from sequences based on either statistical or rule-based knowledge. In this regard, an exemplary embodiment and/or method of the present invention may use techniques described, for example, in U.S. application Ser. No. 10/613,366, entitled "A Fast Feature Selection Method and System for Maximum Entropy Modeling", which was filed Jul. 3, 2003, the disclosures of which is incorporated by reference herein in its entirety.

The dialog management arrangement 103 uses the meaning structures generated by the natural language arrangement 102 to examine a structured manual 104 for relevant information and an inter-related visual model 105 of the device(s) for graphic images thereof. The relevant information from the structured manual 104 and graphic images from the visual model 105 are supplied to a response generation arrangement 106, which formats the information and graphic images in a suitable form for output via the speech synthesis arrangement 107 and visual display arrangement 108. In this regard, the visual display arrangement 108 may provide, for example, 2-D or 3-D images, which may be displayed, for example, in a static or dynamic manner.

The dialog management arrangement 103 provides coordination of interpreting a user's speech and preparing a response. For example, using the question "what does the left object do?," the natural language understanding arrangement 102 is configured to understand this as a "what-is" question and the dialog management arrangement 103 uses this understanding to interact with the structured manual 104 and visual model 105 to identify the object, retrieve certain information regarding the object and the current display, and then send the information to the response generation arrangement 106.

The structured manual 104 and visual model 105 together form a model package that includes, for example, a GSL grammar package and a grammar table. The GSL grammar package includes grammars, which specify, for example, a set of phrases and sentences for the automatic speech recognition arrangement 101 to recognize, such as, for example, questions and/or commands such as "stop", "start", "how to go to a city", etc. The grammar table may include each animation clip and non-animation frame that is associated with a particular grammar defined, for example, using a Grammar Specific Language (GSL). In this regard, when a spoken utterance is given, the automatic speech recognition arrangement 101 may use the corresponding grammar to find its corresponding sentence. Based on the output from the automatic speech recognition arrangement 101, model objects or a user's intended actions may be identified so that an appropriate response to assist the user may be provided.

The model package formed by the structure manual 104 and visual model 105 may also include an objects file to define the spatial and graphical information related to a device's model, including, for example, the location and color of certain device components. In this regard, the model package may include various tables, such as, for example, a "surrounding" table, a "slide" table, a "how-to" table, a "what is" table, and a "select-it" table. In particular, the "surrounding table" may define the adjacent spatial information of an object, which together with information provided by the objects file may define the physical model and relations. The "slide" table may store animation sequences and associated information, including, for example, information regarding the duration of the display and text captions. In this regard, the animation sequences may be interrupted at any point in time. The "how-to" table may link animation clips with objects so that if a how-to action is prompted (e.g., detecting the utterance "how to do this?"), the appropriate animation clip is displayed on the screen. The "what is" table may include a text describing what a particular feature does so that if a what-is action is prompted (e.g., detecting the utterance "what does this do?"), the text may be displayed and/or output as an audio response. The "select-it" table may facilitate the display of a frame to show the result of a control that is enabled, including, for example, the result if a particular button were pushed.

Among these lookup tables, objects may be consistently identified with unique Ids. The structured manual provides an application programming interface (API) for lookup in each table using this unique ID. The natural language understanding arrangement 102 will identify each object in a speech and reference it with its object ID in the further analysis. The dialog management arrangement 103 may use this ID in its operation.

When the display needs to be updated, the current content will also be localized. First, the operation locates a slide corresponding to the new view in the structured manual. Then all objects in the slide are found and a search of each table is performed using the object's ID to construct localized content. In this regard, the localized content may be used for display and fact lookups.

The model package formed by the structured manual 104 and the visual model 105 may be vehicle-specific and/or device-specific, instead of generic, so that the user may more easily locate the corresponding object, or learn the operation of certain devices, including, vehicle-related and non-vehicle-related devices. For example, the exemplary system 100 may involve the construction of one or more device models, which are modular in nature to the overall system so that a common format of presentation may be provided to the user despite differing devices. In this regard, the overall system may be configurable with an appropriate device model with little or no modification of the software.

The speech synthesis arrangement 107 provides an audio response to the user. In particular, the speech synthesis arrangement 107 may include, for example, a text-to-speech (TTS) application to provide the audio response to the user. In this regard, the text-to-speech (TTS) application may take English text and generate a natural and intelligible acoustic speech signal by using a set of rules or models derived from speech data.

The visual display arrangement 108 provides visual information to the user in three-dimensional perspective. In this regard, the visual display arrangement 108 may include, for example, a Cathode Ray Tube (CRT) monitor, liquid crystal display, or other suitable graphic display. It will be appreciated that the visual display arrangement may provide 2-D or 3-D displays. It will also be appreciated that the visual model 105 may be implemented in 2-D or 3-D, or a combination of 3-D and 2-D, so that, for example, depending on a user's input sequence and the orientation of looking angle, the view may be different. Accordingly, a model may be appropriately transformed into 2D to accommodate the user's perspective.

Portions of the exemplary interactive manual system 100 may be implemented using Microsoft Visual C++ 6.0, Nuance Vocalizer 3.0, and Nuance Recognizer 8.0. The exemplary interactive manual system 100 may include, for example, any suitable processing arrangement, such as, for example, a personal computer with an Intel-based microprocessor.

The suitable processing arrangement may be supported, for example, by a wide variety of operating and/or application development environments, including, for example, a Microsoft Windows version 200 environment. It will be appreciated that components 101 to 108 of the exemplary interactive manual system 100 may be collocated on a common platform, or alternatively some or all of these components may reside separately. For example, the automatic speech recognition arrangement 101, the natural language understanding arrangement 102, the dialog arrangement 103, the response generation arrangement 106, the speech synthesis arrangement 107, and the visual display arrangement 108 may all reside in a vehicle, whereas the structured manual 104 and visual mode 105 may reside outside the vehicle at a remote location to be accessible, for example, via a suitable wireless interface. In this regard, the structured manual 104 and visual model 105 may be uploaded and/or downloaded, for example, as needed so that expanded, updated and/or corrected versions of these components may be supported.

Figure 2:
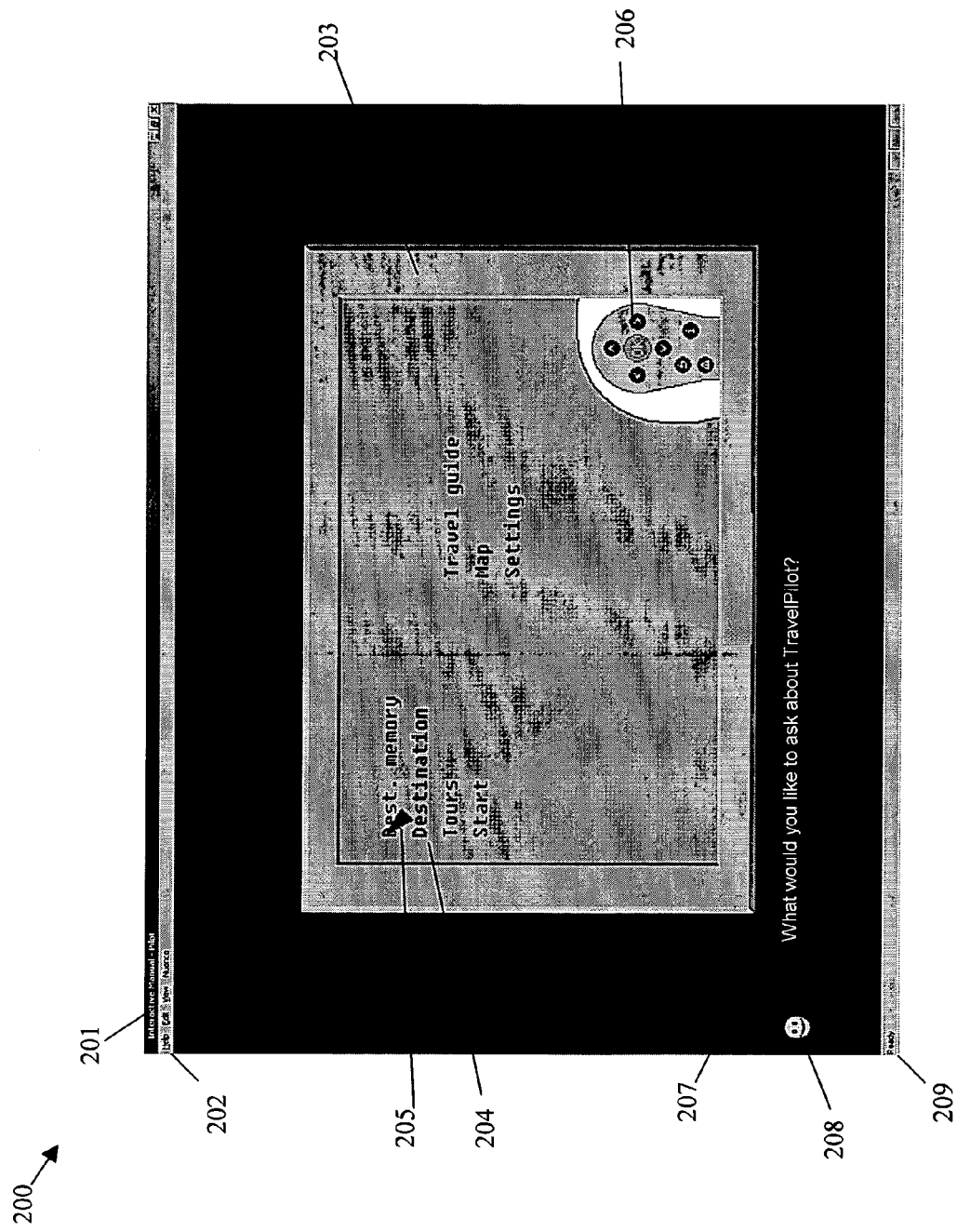
FIG. 2 shows an exemplary interactive manual display.

FIG. 2 shows an exemplary interactive manual (IM) display 200, which includes a window description 201, a menu bar 202 of drop-down and/or popup commands, a sub-window 203, interactive text 204, a cursor 205, interactive graphic displays 206, interrogatories 207, a graphic symbol 208, and a status indicator 209.

According to an exemplary operation of the interactive manual system 100, when a user encounters problems and/or difficulties in operating a device (such as locating a certain device or understanding its operation) the user may talk to the interactive manual, which may respond in an audio and/or visual manner. In this regard, the interactive manual may conduct a simple dialog with the user, and may show the user an animation about the operation of that device. The animation may include a sequence of frames containing so-called animation objects associated with each graphical representation in the frame. Each frame may store the information displayed at a give time. The information may include a text description and an index table for object lookup. The description may be read using a text-to-speech (TTS) application during a demonstration. During the process of playing, a frame is displayed for a pre-defined period of time, and its description may be prompted to read out by the text-to-speech (TTS) application. The current frame may include the information of a slide at the current time. In addition to duplicating a slide's content, an animation object may be highlighted and/or moved, for example, to the position of the selection cursor. For example, the interactive manual may confirm with the user about the device the user is having trouble with and may display the device on a screen with flashing symbols and/or objects.

The content in each frame may include, for example, a list of animation objects. In particular, each graphic representation in the display may be stored as an animation object. Moreover, each instance of an animation object may have a unique name, layout position, and color specification.

FIG. 3 shows exemplary animation object types in block 300. In particular, the animation objects may include, for example, basic shapes, text, or graphic user interface (GUI) objects. In this instance the basic shapes may include, for example, rectangles, boxes, lines, and/or circles. The text may include, for example, single line text and/or multiple line text. The graphic user interface (GUI) objects may include, for example, a text button, an image button, and/or an image.

Each object may store immediate surrounding information relative to its location. For example, each object may store information relative to the left, right, top, bottom, front, back, etc. Additionally, an adjacent object may specify "the most likely to be asked" surrounding object. Moreover, when a direction command (such as north, south, up, down, left, right, etc.) is given, the system may look up the currently selected object's surrounding objects. If no object is found, there is no neighbor object that is available.

Figure 4:
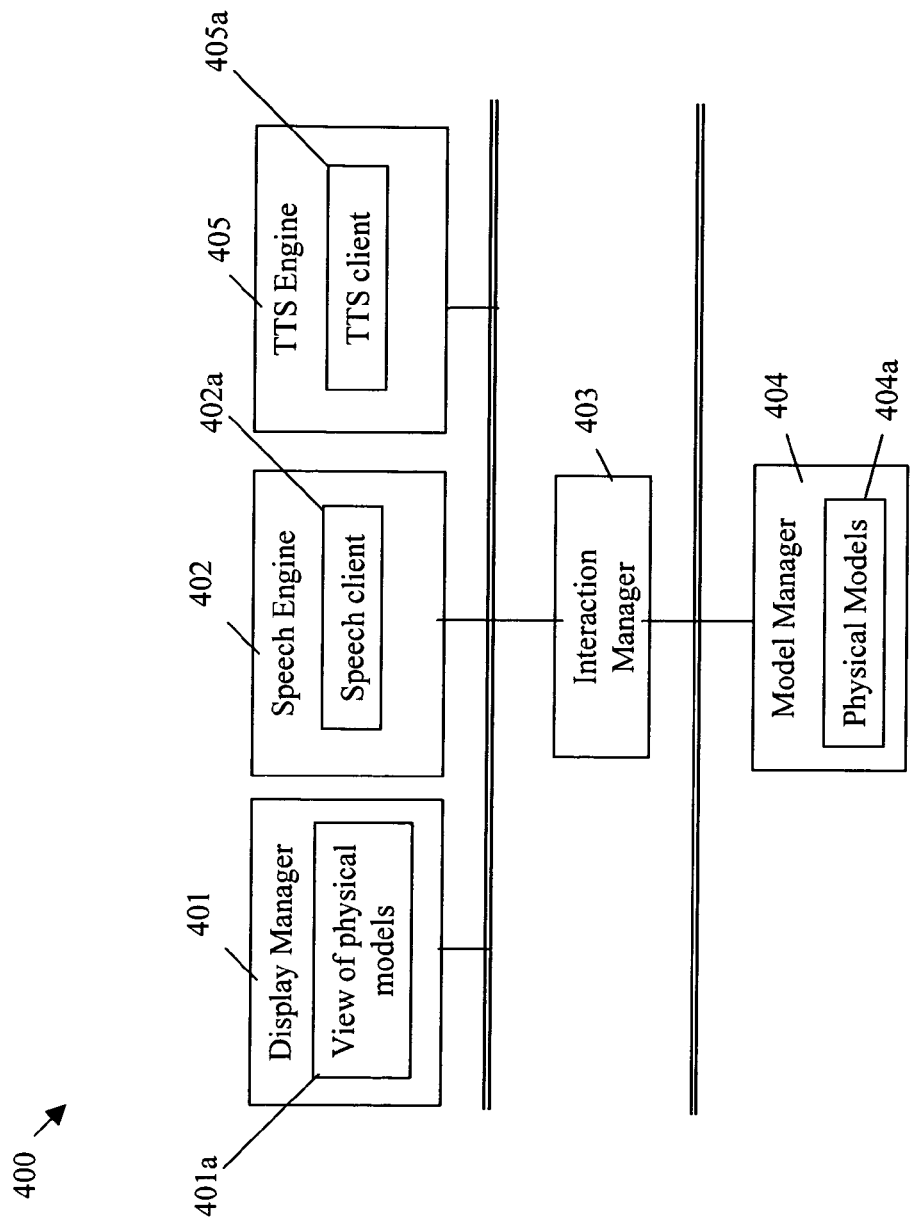
FIG. 4 shows exemplary system architecture for internal messaging between exemplary components of an interactive manual.

FIG. 4 shows an exemplary system architecture 400 for internal messaging between exemplary components of an interactive manual system. In FIG. 4, each rectangular box represents an exemplary component and the lines represent the connector layers. The exemplary components include a Display Manager 401, a Speech Engine 402, a Text-To-Speech (TTS) Engine 405, an Interaction Manager 403, and a Model Manager 404. The exemplary system architecture 400 may be implemented, for example, in software and executed on a suitable processing arrangement.

The exemplary system architecture 400 may be message-based. In this regard, when a component "hooks" onto a top and bottom layer, that component may post messages upward or downward. Components in the same pier (e.g., the Display Manager component 401 and Speech Engine component 402) may not pass messages directly. Through connectors, messages are distributed to the designated components. If a message is specified with a receiving component's name, the connector sends the message to that component only. Otherwise, the message is broadcasted to all components.

Upon the start of the application, the Speech Engine component 402 receives a user's utterance, which may be, for example, a command or a question. The inputted speech is interpreted and the results are sent to the Interaction Manager component 403.

The Interaction Manager component 403 takes corresponding actions, such as, for example, loading a demo animation. In this regard, during the process of playing a demo, the user may interrupt at any point to ask questions regarding the current frame, issue commands to navigate between frames, or jump to another topic.

The Display Manager component 401 may provide a camera view for users to observe the physical models 404a, which are generated by the Model Manager component 404. In this regard, users may verbally control the camera for zooming in or out, rotation and shifting. In a 3-D environment, for example, the camera view may allow users to view different sides of the object.

The Display Manager component 401 displays the current frame on the screen. It may also handle User Interface (UI) inputs, such as, for example, the pressing of a key. The Display Manager component 401 includes a model 401a of the current display, which may be updated by the Model Manager component 404 via the Interaction Manager component 403. The displayer may convert the 3-D model to a 2D display in user's view when needed.

The Model Manager component 404 contains the content of the objects, frames, and animations, and hash tables that provide indexing for fast lookups. In this regard, the Model Manager 404 may include numerous different files which such information so that a suitable model package may be loaded, the appropriate search tables may be constructed, and the resulting device model may be assembled.

The Model Manager component 404 may also provide application programming interfaces (APIs) for spatial and temporal manipulation of the objects and sequences, such as, for example, playback controls or movement controls. In this regard, the playback control may include, for example, rewind, forward, play, reverse, etc., and the movement controls may include, for example, up, down, left, right, in, out, etc.

The Speech Engine component 402 receives voice input, attempts to understand the user's meaning, and passes the meaning to the Interaction Manager component 403. The Speech Engine component 402 may also receive commands from the Interaction Manager component 403 to generate speech. The Text-To-Speech (TTS) component 405 converts text to speech. The Speech Engine component 404 may include, for example, a Language Understanding Processor.

The Interaction Manager component 403 provides overall control of the system, and may be implemented via a finite state machine (finite state grammar), a pushdown automata (context-free grammar), or more complicated automata in Chomsky hierarchy. In this regard, the Interaction Manager component 403 may maintain various system states. The Interaction Manager component 403 receives meaning input from the Speech Engine component 402 and the current system states, and provides a sequence of commands to the other components and adjusts the system states accordingly. The knowledge base for the set of decisions may be described through an interaction description language (IDL).

The interaction description language (IDL) is programmed as pairs of rules and actions. A rule is defined with one or more conditions. If all conditions in a rule are satisfied, the actions associated with the rule are invoked. For example, when the utterances "What is the red button?" and "What is this" are compared, the Speech Engine component 402 generates different meaning structures and therefore different rules are applied. In particular, the Speech Engine component 402 labels the first utterance a "What-is" question and a specific object. The associated action retrieves a description for the "red button". For the second utterance, the Speech Engine component 402 does not provide a specific object. Instead, there are two associated actions. In the first action, a lookup is performed for the currently selected object in the current frame. If it exists, a second lookup is performed for the description of the selection. Otherwise, the input is ignored.

The rules may be classified into four categories, and may be extended based on application needs. In this regard, the rules may be (1) Demo Action Control rules that handle animation sequences, such as, for example, fast-forward, rewind, or stop; (2) Cursor Movement rules that handle item marking using a cursor; (3) Interface Manipulation rules that handle a user action for exploring the target device, such as, for example, selecting a menu item or pressing a button; and (4) Object Query rules that handle questions such as "what-is" and "how-to".

Figure 5:
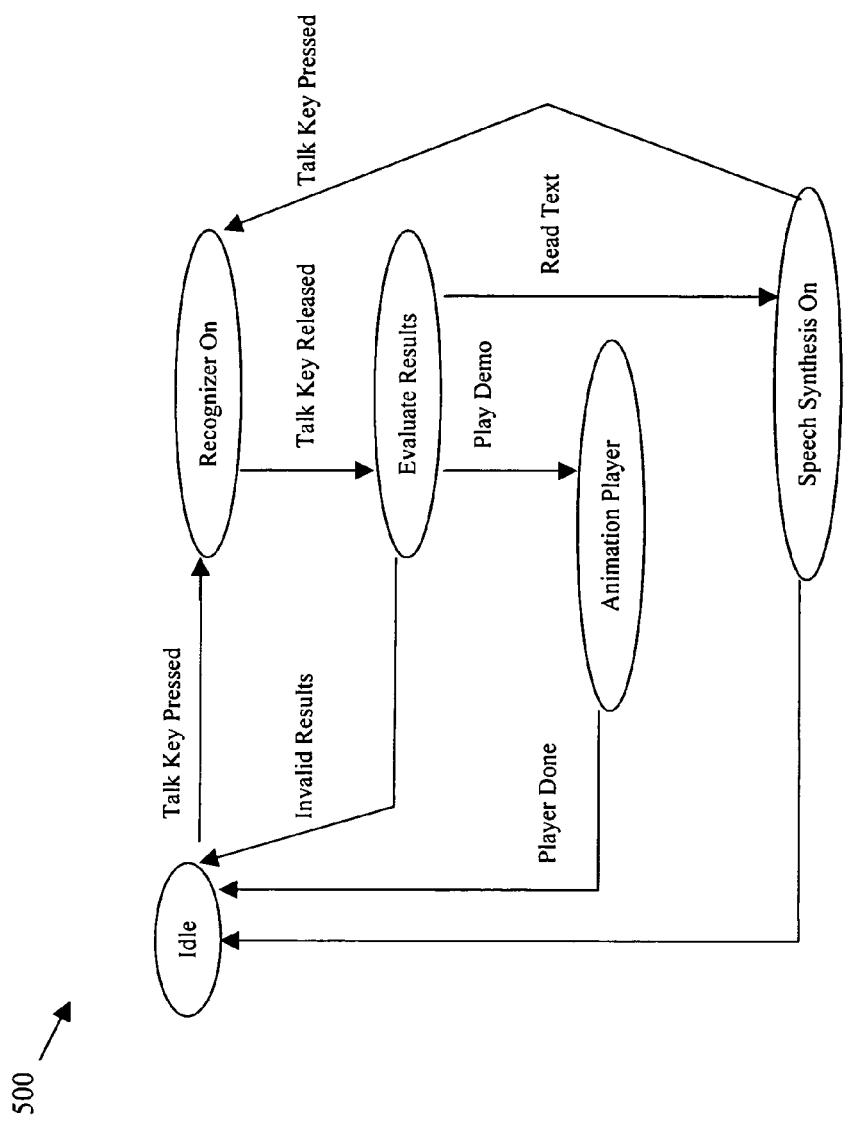
FIG. 5 shows an exemplary finite state machine representation.

FIG. 5 shows an exemplary finite state machine representation 500 for use in implementing the Interaction Manager 403 of FIG. 4. The exemplary finite state machine representation 500 includes states and associate actions to change the states. In this instance, the states include an Idle state, a Recognizer On state, an Evaluate Results state, an Animation Player state, and a Speech Synthesis On state. The actions include a "Talk Key Pressed" action, "Talk Key Released" action, a "Play Demo" action, a "Read Text" action, a "Player Done" action, an "Invalid Results" action. The "Talk Key Pressed" action changes the Idle state or the Speech Synthesis On state to the Recognizer On state, the "Talk Key Released" action changes the Recognizer On state to the Evaluate Results state, the "Read Text" action changes the Evaluate Results state to the Speech Synthesis On state, the "Play Demo" action changes the Evaluate Results state to the Animation Player state, the "Player Done" action changes the Animation Player state to the Idle state, and the "Invalid Results" action changes the Evaluation Results state to the Idle state.

What is claimed is:

1. A method of interacting with a user to provide information regarding an operation of a device, comprising:
   receiving speech input from the user;
   converting the speech into a word sequence;
   identifying a structure to which the word sequence conforms;
   providing a structured manual including information related to an operation of a device;
   providing a visual model to relate a visual representation of the information;
   interpreting the structure in a context and extracting information and associated visual representation from the structured manual and the visual model, wherein the structure is categorized into one of a "how-to" meaning structure category and a "what-is" meaning structure category, each of the meaning structure categories characterizing the structures of its members as being of a single respective underlying meaning structure, different information being deemed pertinent for the extraction depending upon the meaning category into which the structure of the word sequence has been categorized; and
   outputting the information to the user,
   wherein the structure manual and the visual model form a model package that includes a grammar package and a grammar table defined using a grammar specification language,
   wherein the model package further includes an objects file to define device model information that includes a model of at least one device component,
   wherein the object file is associated with at least one of a surrounding table, a slide table, a how-to table, and a what-is table,
   wherein the grammar package includes a set of phrases and sentences as grammars for the speech recognition engine to recognize, and the grammar table includes animation clips associated with the specified grammars, and
   wherein a categorization into the "what-is" meaning structure category causes the dialog arrangement to:
     determine an object in the "what-is" meaning structure;
     determine an object identification of the object;
     search the surrounding table for information of adjacent objects based on the object identification;
     search the what-is table based on the object identification for a textual description associated with a feature of the object; and
     display the textual description when the associated feature is displayed.

2. The method of claim 1, wherein the structure is identified using an automatic speech recognition arrangement and a natural language understanding arrangement.

3. The method of claim 1, wherein the information of the structured manual is arranged based on a human cognition structure.

4. The method of claim 1, wherein the visual graphic representation is one of vehicle-specific and device-specific.

5. The method of claim 1, further comprising:
   receiving further input from the user.

6. The method of claim 5, wherein the further input includes a question regarding the information output to the user.

7. The method of claim 5, wherein the further input includes a cursor movement.

8. The method of claim 5, wherein the further input includes a cursor movement and a question regarding the information output to the user.

9. The method of claim 5, further comprising:
   interrupting the output of information to the user upon receiving the further input from the user;
   converting the further input from the user into further structures;
   extracting information and associated visual representation related to the further structures from the structured manual and the visual model;
   outputting further information to the user; and
   resuming the output of information to the user at a point of interruption.

10. A storage medium having a set of instructions executable by a processor to perform a method of interacting with a user to provide information regarding an operation of a device, the method comprising:
   receiving speech input from the user;
   converting the speech into a word sequence;
   identifying a structure to which the word sequence conforms;
   providing a structured manual including information related to an operation of a device;
   providing a visual model to relate a visual representation of the information;
   interpreting the structure in a context and extracting information and associated visual representation from the structured manual and the visual model, wherein the structure is categorized into one of a "how-to" meaning structure category and a "what-is" meaning structure category, each of the meaning structure categories characterizing the structures of its members as being of a single respective underlying meaning structure, different information being deemed pertinent for the extraction depending upon the meaning category into which the structure of the word sequence has been categorized; and
   outputting the information to the user,
   wherein the structure manual and the visual model form a model package that includes a grammar package and a grammar table defined using a grammar specification language,
   wherein the model package further includes an objects file to define device model information that includes a model of at least one device component,
   wherein the object file is associated with at least one of a surrounding table, a slide table, a how-to table, and a what-is table,
   wherein the grammar package includes a set of phrases and sentences as grammars for the speech recognition engine to recognize, and the grammar table includes animation clips associated with the specified grammars, and
   wherein a categorization into the "what-is" meaning structure category causes the dialog arrangement to:
     determine an object in the "what-is" meaning structure;
     determine an object identification of the object;
     search the surrounding table for information of adjacent objects based on the object identification;

search the what-is table based on the object identification for a textual description associated with a feature of the object; and display the textual description when the associated feature is displayed.

11. An interactive manual system, comprising:

a speech engine to receive and process speech from a user, convert the speech into a word sequence, and identify from the word sequence at least one of a spatial meaning structure, a geometric meaning structure, and a color meaning structure from the word sequence;

a structured manual including textual information related to an operation of a device;

a visual model to relate portions of a visual representation of the device to portions of the textual information;

a dialog management arrangement that uses a context to identify at least one component of the device based on the identified at least one meaning structure and that extracts at least one portion of the textual information and at least one portion of the visual representation that pertain to the identified at least one component, wherein the structure is categorized into one of a "how-to" meaning structure category and a "what-is" meaning structure category; and an output arrangement to output the extracted portions of the textual information and the visual representation, wherein the structure manual and the visual model form a model package that includes a grammar package and a grammar table defined using a grammar specification language, wherein the model package further includes an objects file to define device model information that includes a model of at least one device component, wherein the object file is associated with at least one of a surrounding table, a slide table, a how-to table, and a what-is table, wherein the grammar package includes a set of phrases and sentences as grammars for the speech recognition engine to recognize, and the grammar table includes animation clips associated with the specified grammars, and wherein a categorization into the "what-is" meaning structure category causes the dialog arrangement to:

determine an object in the "what-is" meaning structure;

determine an object identification of the object;

search the surrounding table for information of adjacent objects based on the object identification;

search the what-is table based on the object identification for a textual description associated with a feature of the object; and display the textual description when the associated feature is displayed.

12. An interactive manual system, comprising:

a speech engine to receive and process speech from a user, convert the speech into a word sequence, and identify a structure to which the word sequence conforms;

a structured manual including information related to an operation of a device;

a visual model to relate a visual representation of the information;

a dialog management arrangement to interpret the structure in a context and to extract pertinent information and the visual representation from the structured manual and the visual model, wherein the structure is categorized into one of a "how-to" meaning structure category and a "what-is" meaning structure category, each of the meaning structure categories characterizing the structures of its members as being of a single respective underlying meaning structure, different information being deemed pertinent for the extraction depending upon the meaning structure category into which the structure of the word sequence has been categorized; and an output arrangement to output the information and visual representation, wherein the structure manual and the visual model form a model package that includes a grammar package and a grammar table defined using a grammar specification language, wherein the model package further includes an objects file to define device model information that includes a model of at least one device component, wherein the object file is associated with at least one of a surrounding table, a slide table, a how-to table, and a what-is table, wherein the grammar package includes a set of phrases and sentences as grammars for the speech recognition engine to recognize, and the grammar table includes animation clips associated with the specified grammars, and wherein a categorization into the "what-is" meaning structure category causes the dialog arrangement to:

determine an object in the "what-is" meaning structure;

determine an object identification of the object;

search the surrounding table for information of adjacent objects based on the object identification;

search the what-is table based on the object identification for a textual description associated with a feature of the object; and display the textual description when the associated feature is displayed.

13. The interactive manual system of claim 12, wherein the speech engine includes an automatic speech recognition arrangement and a natural language understanding arrangement.

14. The interactive manual system of claim 13, wherein the natural language understanding arrangement identifies the structure from one of statistical and rule-based knowledge.

15. The interactive manual system of claim 12, wherein the device includes at least one of a vehicle and a device that resides in the vehicle.

16. The interactive manual system of claim 12, wherein the information of the structured manual is arranged based on a human cognition structure.

17. The interactive manual system of claim 12, wherein the visual representation is one of vehicle-specific and device-specific.

18. The interactive manual system of claim 12, wherein the output arrangement includes a visual display and a speech synthesis arrangement.

19. The interactive manual system of claim 18, wherein the visual display includes at least one of a 2-D and a 3-D display.

20. The interactive manual system of claim 18, wherein the visual display includes multiple levels.

21. The interactive manual system of claim 18, wherein the visual display includes an animation of an operation.

22. The interactive manual system of claim 12, wherein the speech synthesis arrangement includes a text-to-speech (TTS) application.

23. The interactive manual system of claim 12, wherein the output arrangement provide at least one of verbal and visual cues to guide the user.

24. The interactive manual system of claim 12, wherein the dialog management arrangement interprets the structure based on an interaction description language.

25. The interactive manual system of claim 12, wherein the object file includes a surrounding table including an object data of at least one object to define at least one of spatial and graphical information of at least one adjacent object to the at least one object, and the object data of the at least one object includes directional information of the at least one adjacent object relative to a position of the at least one object.

26. The interactive manual system of claim 25, wherein the directional information includes information indicating at least one of a left direction, a right direction, an upwards direction, a downwards direction, a forward direction, and a backward direction.

27. The interactive manual system of claim 25, wherein the object data of the at least one object further includes information according to which a likelihood of pertinence of a surrounding object to the speech from the user is determined.

28. The interactive manual system of claim 12, wherein the system is configured for modular construction of the model package to include a plurality of device models with a common presentation format for the plurality of device models.

29. An interactive manual system, comprising:
a speech engine to receive and process speech from a user, convert the speech into a word sequence, and identify a structure to which the word sequence conforms;
a structured manual including information related to an operation of a device;
a visual model to relate a visual representation of the information;
a dialog management arrangement to interpret the structure in a context and to extract pertinent information and the visual representation from the structured manual and the visual model, wherein the structure is categorized into one of a "how-to" meaning structure category and a "what-is" meaning structure category, each of the meaning structure categories characterizing the structures of its members as being of a single respective underlying meaning structure, different information being deemed pertinent for the extraction depending upon the meaning structure category into which the structure of the word sequence has been categorized; and
an output arrangement to output the information and visual representation,
wherein the structure manual and the visual model form a model package that includes a grammar package and a grammar table defined using a grammar specification language,
wherein the model package further includes an objects file to define device model information that includes a model of at least one device component,
wherein the object file is associated with at least one of a surrounding table, a slide table, a how-to table, and a what-is table,
wherein the grammar package includes a set of phrases and sentences as grammars for the speech recognition engine to recognize, and the grammar table includes animation clips associated with the specified grammars, and
wherein a categorization into the "how-to" meaning structure category causes the dialog arrangement to:
 determine an object in the "how-to" meaning structure;
 determine an object identification of the object;
 search the surrounding table for information of adjacent objects based on the object identification;
 search the slide table for animation clips associated with the object identification;
 link the animation clips associated with the object identification and the animation clips in the grammar table; and
 display the linked animation clips.

30. The interactive manual system of claim 29, wherein the system is configured for modular construction of the model package to include a plurality of device models with a common presentation format for the plurality of device models.

31. An interactive manual system, comprising:
a speech engine configured for converting an utterance from a user into a word sequence and identifying a meaning structure category to which the word sequence conforms based on one of a statistical method and rule-based method, a determination being made whether the utterance is a command or a question, the meaning structure category being identified as either a "how-to" meaning structure category or a "what-is" meaning structure category;
a display manager arrangement configured for displaying views of a current object based on the command;
a model manager arrangement configured for storing manual data regarding at least one object, and an object file, the manual data including text descriptions, static display frames, animation clips, and a lookup table for searching the manual data, the object file including at least one of spatial and graphical information of the object; and
an interaction manager arrangement, programmed with a plurality of rule and action pairs, configured for controlling a display via the display manager arrangement and based on an identified meaning structure category;
wherein the interaction manager arrangement identifies an object in one of the identified meaning structure categories, determines a rule based on the identified object and the identified meaning structure category, and generates a display via the display manager arrangement based on manual data and object file data associated with the identified object and the identified meaning structure category.

32. The interactive manual system of claim 31, wherein the manual data include a grammar package and a grammar table defined using a grammar specification language.

33. The interactive manual system of claim 32, wherein the objects file includes a model of at least one device component.

34. The interactive manual system of claim 33, wherein the object file is associated with at least one of a surrounding table, a slide table, a how-to table, and a what-is table.

35. The interactive manual system of claim 34, wherein the grammar package includes a set of phrases and sentences as grammars for the speech engine to recognize, and the grammar table includes animation clips associated with the specified grammars.

36. A method of interacting with a user to provide information regarding an operation of a device, comprising:
receiving speech input from the user;
converting the speech into a word sequence;
identifying a structure to which the word sequence conforms;
providing a structured manual including information related to an operation of a device;
providing a visual model to relate a visual representation of the information;
interpreting the structure in a context;
extracting information and associated visual representation from the structured manual and the visual model, wherein the structure is categorized into one of a "how-to" meaning structure category and a "what-is" meaning structure category, each of the meaning structure categories characterizing the structures of its members as being of a single respective underlying meaning structure, different information being deemed pertinent for the extraction depending upon the meaning category into which the structure of the word sequence has been categorized; and outputting the information to the user, wherein the structure manual and the visual model form a model package that includes a grammar package and a grammar table defined using a grammar specification language, wherein the model package further includes an objects file to define device model information that includes a model of at least one device component, wherein the object file is associated with at least one of a surrounding table, a slide table, a how-to table, and a what-is table, wherein the grammar package includes a set of phrases and sentences as grammars for the speech recognition engine to recognize, and the grammar table includes animation clips associated with the specified grammars, and wherein a categorization into the "how-to" meaning structure category causes the dialog arrangement to:
  determine an object in the "how-to" meaning structure;
  determine an object identification of the object;
  search the surrounding table for information of adjacent objects based on the object identification;
  search the slide table for animation clips associated with the object identification;
  link the animation clips associated with the object identification and the animation clips in the grammar table; and
  display the linked animation clips.

37. A storage medium having a set of instructions executable by a processor to perform a method of interacting with a user to provide information regarding an operation of a device, the method comprising:

receiving speech input from the user;
converting the speech into a word sequence;
identifying a structure to which the word sequence conforms;
providing a structured manual including information related to an operation of a device;
providing a visual model to relate a visual representation of the information;
interpreting the structure in a context;
extracting information and associated visual representation from the structured manual and the visual model, wherein the structure is categorized into one of a "how-to" meaning structure category and a "what-is" meaning structure category, each of the meaning structure categories characterizing the structures of its members as being of a single respective underlying meaning structure, different information being deemed pertinent for the extraction depending upon the meaning category into which the structure of the word sequence has been categorized; and
outputting the information to the user,
wherein the structure manual and the visual model form a model package that includes a grammar package and a grammar table defined using a grammar specification language,
wherein the model package further includes an objects file to define device model information that includes a model of at least one device component,
wherein the object file is associated with at least one of a surrounding table, a slide table, a how-to table, and a what-is table,
wherein the grammar package includes a set of phrases and sentences as grammars for the speech recognition engine to recognize, and the grammar table includes animation clips associated with the specified grammars, and
wherein a categorization into the "how-to" meaning structure category causes the dialog arrangement to:
  determine an object in the "how-to" meaning structure;
  determine an object identification of the object;
  search the surrounding table for information of adjacent objects based on the object identification;
  search the slide table for animation clips associated with the object identification;
  link the animation clips associated with the object identification and the animation clips in the grammar table; and
  display the linked animation clips.

38. An interactive manual system, comprising:

a speech engine to receive and process speech from a user, convert the speech into a word sequence, and identify from the word sequence at least one of a spatial meaning structure, a geometric meaning structure, and a color meaning structure from the word sequence;
a structured manual including textual information related to an operation of a device;
a visual model to relate portions of a visual representation of the device to portions of the textual information;
a dialog management arrangement that uses a context to identify at least one component of the device based on the identified at least one meaning structure and that extracts at least one portion of the textual information and at least one portion of the visual representation that pertain to the identified at least one component, wherein the structure is categorized into one of a "how-to" meaning structure category and a "what-is" meaning structure category; and
an output arrangement to output the extracted portions of the textual information and the visual representation,
wherein the structure manual and the visual model form a model package that includes a grammar package and a grammar table defined using a grammar specification language,
wherein the model package further includes an objects file to define device model information that includes a model of at least one device component,
wherein the object file is associated with at least one of a surrounding table, a slide table, a how-to table, and a what-is table,
wherein the grammar package includes a set of phrases and sentences as grammars for the speech recognition engine to recognize, and the grammar table includes animation clips associated with the specified grammars, and
wherein a categorization into the "how-to" meaning structure category causes the dialog arrangement to:
  determine an object in the "how-to" meaning structure;
  determine an object identification of the object;
  search the surrounding table for information of adjacent objects based on the object identification;
  search the slide table for animation clips associated with the object identification;
  link the animation clips associated with the object identification and the animation clips in the grammar table; and display the linked animation clips.

* * * * *